United States Patent [19]

Gurtner

[11] 4,358,272
[45] Nov. 9, 1982

[54] MOTOR-VEHICLE DRIVING INSTRUCTION AND TESTING APPARATUS

[76] Inventor: Michel Gurtner, 18B, chemin Francois Chavaz, CH-1213 Onex, Switzerland

[21] Appl. No.: 209,012

[22] Filed: Nov. 21, 1980

[30] Foreign Application Priority Data

Feb. 20, 1980 [CH] Switzerland .......................... 1351/80

[51] Int. Cl.³ ............................................. G09B 19/16
[52] U.S. Cl. ......................................... 434/62; 73/128;
346/18; 346/33 D; 346/49
[58] Field of Search ........................ 434/62, 65, 66, 71;
346/18, 49, 33 D, 121, 122, 123; 73/128, 129

[56] References Cited

U.S. PATENT DOCUMENTS

| | | | |
|---|---|---|---|
| 2,982,594 | 5/1961 | Riegger et al. | 346/121 X |
| 3,310,662 | 3/1967 | Greenshields | 434/65 X |
| 3,479,750 | 11/1969 | Swanson | 434/62 |

Primary Examiner—William H. Grieb
Attorney, Agent, or Firm—McAulay, Fields, Fisher, Goldstein & Nissen

[57] ABSTRACT

The apparatus measures the braking of the vehicle and the turning action on the wheels, secondarily the speed and the acceleration or the running of the engine. It records these measurements graphically and simultaneously so that, if necessary, the driver may correct his mistakes. A warning is activated if the vehicle is braked and its wheels are turned at the same time. This warning is graphic, audible or visual. The apparatus is useful for driving instruction and tests.

6 Claims, 2 Drawing Figures

MOTOR-VEHICLE DRIVING INSTRUCTION AND TESTING APPARATUS

FIELD OF THE INVENTION

This invention relates to a driving instruction and testing apparatus which records and displays graphically and simultaneously the braking and turning of the wheels of the vehicle, secondarily the speed, acceleration or running of the engine and, if desired, the gear engaged in the gear box.

When a driver loses control of his vehicle, questions are asked as to the cause of this serious fault. If the loss of control takes place around a bend, experts concur in saying that the speed of the vehicle was excessive, that the driver did not have time to decelerate and that he instinctively braked and turned. In the latter case, the driver—not noticing and being unfamiliar with the dynamic behaviour of his vehicle—reacted incorrectly and inappropriately. Now the question arises of how to verify whether the driver knows how to handle his vehicle, whether or not he knows the technique and dynamics of driving; and how the proper response can be instilled in him?

OBJECT AND SUMMARY OF THE INVENTION

This is precisely the objective achieved by the apparatus according to the present invention which comprises on the one hand means for measuring the braking and for measuring the turning of the wheels of the vehicle and, on the other hand, means for graphically and simultaneously recording these measurements.

Advantageously, the apparatus according to the invention records and graphically displays other relevant data which also contribute towards good driving, such as the speed of the vehicle and its acceleration or the running of its engine as well as indicates which gear engaged in the gear box.

In one preferred recording and display arrangement which is intended better to display faults and thus to contribute—by systematically avoiding them—towards the acquisition of the proper responses, a warning in the form of a graphic recording or audible or visual signal is triggered off when simultaneously the vehicle is braked and the wheels are turned. In the context of the invention, "turning" is understood to mean both turning properly in the direction of the bend and correcting in the opposite direction. Preferably, the recording will only be activated if the turning action is sufficient and sufficiently continuous to correspond to actual turning.

BRIEF DESCRIPTION OF THE DRAWING

The advantage of the apparatus according to the invention in conjunction with the principles of driving will be better understood by reference to the accompanying drawing which also illustrates by way of example an arrangement for graphically recording the data collected by the measuring means.

Referring to FIG. 1 and to universally known dynamic laws, it is known that the driver has to decelerate before a sudden bend and that the vehicle has to be braked in the braking zone A for its weight to be transferred to the front end. Thereafter, when the vehicle has entered the restabilising zone B, it regains its balance. With the vehicle still travelling in a straight line, the driver begins to re-accelerate progressively and, on entering the bend, he turns and at the same time accelerates the vehicle (zone C). By driving in this way, the driver notices and is aware of the dynamic behaviour of his vehicle. In other words, he is driving correctly.

FIG. 2 shows the recording/graphic display interface of the apparatus of the invention which outwardly resembles a tachograph or a taximeter of the type found in trucks and taxis. In the drawing, it assumes the form of a disc rotating as a function of time on which curves or parts of curves are traced by means of five stylographs (not shown).

The first of these stylographs inscribes the braking of the vehicle on the disc at a after it has been measured, for example, via the braking circuits.

The second stylograph inscribes the turning (or correcting) of the vehicle at b after it has been measured via the steering elements. It is only beyond a certain turning angle that the stylograph begins to function to avoid any unnecessary recording, for example, in the case of gentle curves.

The third stylograph acting as an alarm only functions (at c) if the vehicle is simultaneously braked and turned or corrected. It may be replaced and/or completed by an audible or visual signal.

The fourth stylograph inscribes the speed of the vehicle on the disc at d. It may be connected to the speedometer cable of the vehicle.

The fifth stylograph records the running of the engine, i.e. the idling, the acceleration and the deceleration of the vehicle on the disc at e and may be connected to the revolution counter.

Figure 1:
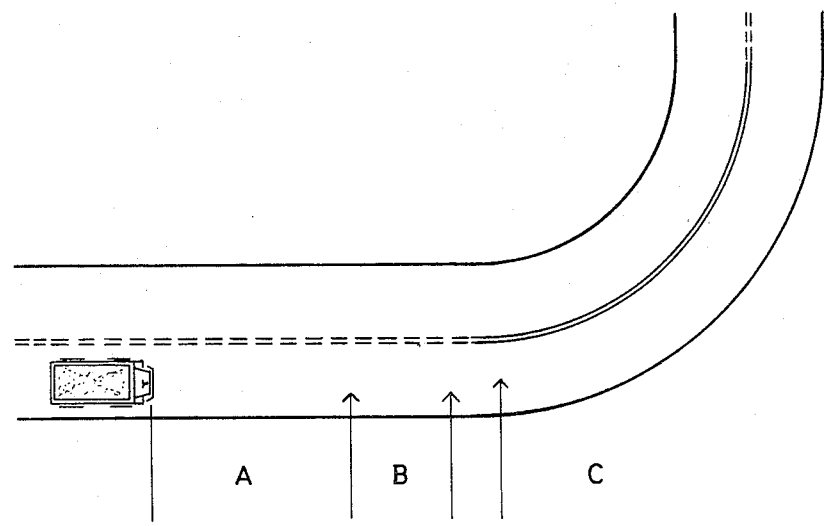
FIG. 1 diagrammatically illustrates a two-lane road comprising a straight section divided by a dividing line and a curved section or bend divided by a safety line.
Figure 2:
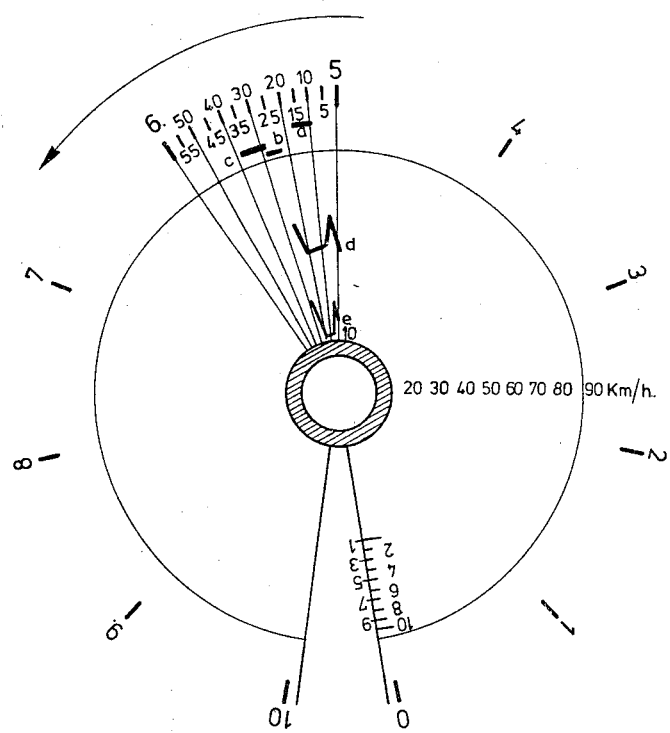
FIG. 2 is a diagrammatic view of a display of a recording of a driver's actions as supplied by the measuring means.

In FIG. 2, which shows the time scale in minutes and seconds the speed scale in km/h and the acceleration scale in m/s, the duration of the recordings increases to 10 minutes per disc, after which the disc passes into the cover of the apparatus to await collection. A new disc automatically appears and so on. The traces left by the stylographs are indelible and easy to read.

A few actions recorded from the fifth minute will be read from the centre outwards, the fourth stylograph recording the speed of the vehicle at d. It is accompanied by the fifth stylograph which records the acceleration, deceleration and idling of the engine. For economical driving and noise-control tests, the traces left by these stylographs assume a certain importance. After 5 minutes and 10 seconds, a braking of approximately 5 seconds duration recorded by the first stylograph is read at a. After this braking action, another three recorded actions are read almost simultaneously, namely the re-acceleration at e, the speed at d, the turning and possibly the correcting at b recorded by the second stylograph; then a difficulty suddenly arises around a bend or coming out of a bend, the driver brakes and turns or corrects at the same time and the curve c is recorded by the third stylograph. Since nothing has been recorded it can be seen that the engine has stopped and has thus stalled.

The recordings of each stylograph are preferably different in colour.

In a modification where there is no graphic warning at c when the driver makes the error of turning the wheels and braking, this error is easily detected by the fact that curves a and b correspond over all or part of one and the same angular sector.

The apparatus is advantageously switched on and off by a key which may be withdrawn in two positions after having controlled one position or the other so that the driver is unable freely to modify the operation of the apparatus during a practical driving test. The apparatus may be switched on and off both when the vehicle is in motion and when it it stationary.

Thus for a given bend, the apparatus makes it possible to detect the behaviour of the vehicle and of the driver and to record three different situations: 1. The mistake of the driver who brakes, turns and corrects at the same time. 2. The mistake of the driver who takes a bend with too little or too much power, for example in fourth gear at 1500 r.p.m. or in first gear at 6000 r.p.m. 3. The driver who is driving correctly. It will readily be appreciated that the apparatus according to the invention is useful for driving instruction for part of a practical driving test and for advanced-driving courses in that it sanctions the way to negotiate a bend and helps the driver to understand the relationship which exists between the running of the engine and the choice of gear.

The exercises may be conducted on tracks, on specially designed test circuits or even on roads where the bends lend themselves to recordings of the type in question.

The apparatus according to the invention may comprise means for simultaneously recording, inscribing and displaying other data directly on the disc or even on a strip of paper paper tape, for example, by means of a mini-computer. These data may include, for example, the incorrect position of the driver, detected for example by sensors built into the back of the seat, or the fact that his foot is resting on the clutch pedal; also certain deficiencies and faults which have not been noticed by the driver although they should have been during the usual inspection preceding a trip (loose wheel, minimum or emergency levels of fuel, oil, water, antifreeze, brake fluid and the like, headlamps, rear lights or indicators not working); as well as intervention by the driving instructor or examiner by means of a dual-control systems.

These secondary data may of course be graded in order of importance, all or some of them being eliminated by pushing a button associated with the apparatus.

Finally, the apparatus according to the invention may be fitted both to motor cars and to motor cycles and mopeds.

I claim:

1. A motor vehicle driving instruction and testing apparatus, comprising, in combination:
   a disc rotating as a function of time;
   means for measuring the turning of the wheels of said vehicle;
   warning means activated when said vehicle is simultaneously braked and said wheels are turned;
   recording means for graphically and simultaneously recording combined braking and turning actions;
   said recording means comprising stylographs adapted to place markings on said disc.

2. The apparatus of claim 1, further including means for measuring the speed of said vehicle, its acceleration or the running of the engine thereof together with corresponding graphic recording means therefor.

3. The apparatus of claim 1, wherein said warning means are a graphic recording, an audible signal or a visual signal.

4. The apparatus of claims 1 or 2, comprising:
   a first stylograph for inscribing the braking of said vehicle on said disc after said braking has been measured by braking circuits;
   a second stylograph for inscribing on said disc turning or correcting of said vehicle beyond a certain turning angle not including gentle curves;
   a third stylograph for noting on said disc when the vehicle is simultaneously braked and turned or corrected;
   a fourth stylograph for inscribing on said disc the speed of said vehicle; said fourth stylograph being connected to the speedometer cable of said vehicle; and
   a fifth stylograph connected to the revolution counter of said vehicle and recording on said disc the idling of the engine and the acceleration and deceleration of said vehicle.

5. The apparatus of claim 1, including means providing a new disc after a given recording period.

6. The apparatus of claims 1 or 4, wherein the recordings of each stylograph on said disc are in different colors.

* * * * *